(12) United States Patent
Feng (10) Patent No.: US 10,283,168 B2
(45) Date of Patent: May 7, 2019

(54) AUDIO FILE RE-RECORDING METHOD, DEVICE AND STORAGE MEDIUM

(71) Applicant: GUANGZHOU KUGOU COMPUTER TECHNOLOGY CO., LTD., Guangzhou (CN)

(72) Inventor: Suiyu Feng, Guangzhou (CN)

(73) Assignee: GUANGZHOU KUGOU COMPUTER TECHNOLOGY CO., LTD., Guangzhou, Guangdong Province (CN)

( * ) Notice: Subject to any disclaimer, the term of this patent is extended or adjusted under 35 U.S.C. 154(b) by 0 days.

(21) Appl. No.: 15/968,674

(22) Filed: May 1, 2018

(65) Prior Publication Data

US 2018/0247675 A1 Aug. 30, 2018

Related U.S. Application Data

(63) Continuation of application No. PCT/CN2016/094649, filed on Aug. 11, 2016.

(30) Foreign Application Priority Data

Nov. 23, 2015 (CN) .......................... 2015 1 0810824

(51) Int. Cl.
  *G11B 27/031* (2006.01)
  *G11B 27/28* (2006.01)
  (Continued)

(52) U.S. Cl.
  CPC ............. *G11B 27/28* (2013.01); *G10H 1/361* (2013.01); *G11B 20/10527* (2013.01);
  (Continued)

(58) Field of Classification Search
  CPC . G06F 3/16; G06F 3/162; G06F 3/165; G06F 3/167; G06F 17/24; G06F 17/2419;
  (Continued)

(56) References Cited

U.S. PATENT DOCUMENTS 5,712,957 A * 1/1998 Waibel ..................... G06K 9/03
704/240
5,799,273 A * 8/1998 Mitchell ................... G06F 3/16
704/235

(Continued)

FOREIGN PATENT DOCUMENTS

| CN | 101840722 A | 9/2010 |
| CN | 104347096 A | 2/2015 |
| JP | H04325988 A | 11/1992 |

OTHER PUBLICATIONS

Guangzhou Kugou Computer Technology Co. Ltd., International Search Report and Written Opinion, PCT/CN2016/094649, dated Nov. 10, 2016, 15 pgs.

(Continued)

*Primary Examiner* — Andrew C Flanders
(74) *Attorney, Agent, or Firm* — Morgan, Lewis & Bockius LLP (57) ABSTRACT

Provided are an audio file re-recording method and device, and a storage medium. The method includes: determining first time, the first time being start time of a recorded clip to be re-recorded in an audio file; playing a first recorded clip that has been recorded, the first recorded clip using the first time as end time in the audio file; upon arrival of the first time, collecting first voice data of a user to obtain a second recorded clip; and processing the first recorded clip and the second recorded clip to obtain a re-recorded audio file.

9 Claims, 8 Drawing Sheets

(51) Int. Cl.
    *G11B 27/022*     (2006.01)
    *G10H 1/36*     (2006.01)
    *G11B 20/10*     (2006.01)
    *G10L 25/18*     (2013.01)
    *G10L 25/48*     (2013.01)

(52) U.S. Cl.
    CPC .......... *G11B 27/022* (2013.01); *G11B 27/031* (2013.01); *G10H 2230/015* (2013.01); *G10H 2250/025* (2013.01); *G10H 2250/035* (2013.01); *G10L 25/18* (2013.01); *G10L 25/48* (2013.01); *G11B 2020/10546* (2013.01)

(58) Field of Classification Search
    CPC ............. G10H 2240/325; G10H 1/361; H04N 21/4307; G11B 27/28; G11B 27/031; G11B 27/022; G11B 27/036; G11B 27/038; G11B 27/028; G11B 27/02; G11B 27/029; G11B 27/032; G11B 27/034; G11B 20/10527; G11B 2020/10546; G06B 5/06; G06B 5/062
See application file for complete search history.

(56) References Cited

U.S. PATENT DOCUMENTS

| | | | | |
|---|---|---|---|---|
| 6,064,961 | A * | 5/2000 | Hanson | G10L 15/26 704/235 |
| 7,231,351 | B1 * | 6/2007 | Griggs | G10L 15/26 704/243 |
| 8,548,618 | B1 * | 10/2013 | Story, Jr. | H04N 21/439 700/94 |
| 2003/0083885 | A1 * | 5/2003 | Frimpong-Ansah | G10L 15/26 704/277 |
| 2006/0069561 | A1 * | 3/2006 | Beattie | G09B 5/04 704/251 |
| 2007/0088712 | A1 * | 4/2007 | Watson | G09B 5/06 |
| 2007/0106508 | A1 * | 5/2007 | Kahn | G10L 15/22 704/235 |
| 2008/0140652 | A1 * | 6/2008 | Millman | G06F 17/30716 |
| 2010/0324902 | A1 * | 12/2010 | Kurzweil | G09B 5/062 704/260 |
| 2013/0006643 | A1 * | 1/2013 | Lindahl | G10L 15/22 704/275 |
| 2013/0124212 | A1 * | 5/2013 | Scoggins, II | H04N 9/475 704/276 |
| 2013/0130216 | A1 * | 5/2013 | Morton | G09B 5/062 434/317 |
| 2014/0223272 | A1 * | 8/2014 | Arora | G09B 5/06 715/203 |

OTHER PUBLICATIONS

Guangzhou Kugou Computer Technology Co. Ltd., International Preliminary Report on Patentability, PCT/CN2016/094649, dated May 29, 2018, 4 pgs.

Willow Sofware, "Auvil Studio," User's Guide, Jun. 1, 2011, 77 pgs.

* cited by examiner

AUDIO FILE RE-RECORDING METHOD, DEVICE AND STORAGE MEDIUM

PRIORITY CLAIM AND RELATED APPLICATION

This application is a continuation application of PCT/CN2016/094649, entitled "AUDIO FILE RE-RECORDING METHOD AND DEVICE, AND STORAGE MEDIUM" filed on Aug. 11, 2016, which claims priority to Chinese Patent Application No. 201510810824.X, filed with the State Intellectual Property Office of the People's Republic of China on Nov. 23, 2015, entitled "AUDIO FILE RE-RECORDING METHOD AND DEVICE", both of which are incorporated herein by reference in their entirety.

TECHNICAL FIELD

The present disclosure relates to the field of terminal technologies, and in particular, to an audio file re-recording method and device, and a storage medium.

BACKGROUND

In modern life, to enrich the spare-time life of users, more and more recording applications are installed in mobile terminals, and based on these recording applications, the users can record audio files without going into professional recording studios. In the process of recording an audio file, a certain voice clip in the recorded audio file probably cannot reach the expected effect of a user; to improve the listening effect of the recorded audio file, it is required to re-record the voice clip in the audio file.

At present, the recording applications in the mobile terminal provide a re-recording function. When a re-recording instruction is received, the mobile terminal plays an accompaniment file through a loudspeaker and collects voice of the user through a microphone to obtain an audio file. After multiple audio files are obtained through multiple individual re-recording operations, the mobile terminal can finally obtain a re-recorded audio file through editing and splicing the multiple audio files.

In general, the part in the audio file that requires to be re-recorded may be only one sentence or one paragraph, repeatedly re-recording the entire audio file increases resource consumption of the mobile terminal, and since the breath of the user, the distance between the user and the microphone, the tone and so on are different in each re-recording, data collected by the mobile terminal each time is different, and the listening effect of the re-recorded audio file obtained through editing and splicing is still poor, and sometimes, the spliced trace may be obviously perceived.

SUMMARY

To solve the problem of the prior art, embodiments of the present disclosure provide an audio file re-recording method and device.

In one aspect of the present disclosure, an audio file re-recording method is performed at a terminal having one or more processors and memory storing a plurality of program instructions be executed by the one or more processors, the method comprising:
determining first time, the first time being start time of a recorded clip to be re-recorded in an audio file;
playing a first recorded clip that has been recorded, the first recorded clip using the first time as end time in the audio file;
upon arrival of the first time, collecting first voice data of a user to obtain a second recorded clip; and
processing the first recorded clip and the second recorded clip to obtain a re-recorded audio file.

In another aspect of the present disclosure, an audio file re-recording device has one or more processors, memory coupled to the one or more processors, and a plurality of program instructions stored in the memory that, when executed by the one or more processors, cause the electronic apparatus to perform the aforementioned method.

In yet another aspect of the present disclosure, non-transitory computer readable storage medium stores a plurality of program instructions in connection with an electronic apparatus having one or more processors. The plurality of program instructions, when executed by the one or more processors, cause the electronic apparatus to perform the aforementioned method.

According to the present disclosure, there is no need to repeatedly record a sound spectrum file, by playing voice clips in front of a voice clip to be re-recorded, the user can listen to the previously recorded voice clips before re-recording the voice clip to be re-recorded, in order to adjust the breath of the user, the distance between the user and the microphone, the tone and so on. Based on the collected singing data, the audio file obtained through editing and splicing by the mobile terminal has good listening effect, and the hearer is unperceivable to the spliced trace.

BRIEF DESCRIPTION OF THE DRAWINGS

To describe the technical solutions in embodiments of the present disclosure more clearly, the accompanying drawings required for describing the embodiments are briefly introduced below. Apparently, the accompanying drawings in the following description show merely some embodiments of the present disclosure, and a person of ordinary skill in the art can still derive other accompanying drawings from these accompanying drawings without creative efforts.

DETAILED DESCRIPTION

To describe the purpose, the technical solutions and the advantages of the present disclosure more clearly, implementation modes of the present disclosure are further described in details below with reference to the accompanying drawings.

With the development of terminal technologies, to meet the singing needs of users, various applications for recording songs are installed in mobile terminals. For some non-professional singers, it is difficult to control the breaths and emotions during recording an audio file, rendering that it is difficulty for some voice clips to achieve the expected effect of users, and at this time, the users would usually re-record these voice clips. Since the audio files are repeatedly re-recorded individually, and the repeatedly re-recorded audio files are edited and spliced, resource consumption of the mobile terminal is increased, and when the spliced audio file is played, the hearers can apparently sense that it is not done by the singer coherently.

With this regard, embodiments of the present disclosure provide an audio file re-recording method. In the method, when a certain recorded clip is re-recorded, by playing recorded clips in front of a recorded clip to be re-recorded, the user remembers the previous singing scenario and adjusts the tone, the intensity, the distance to the microphone, the breath and so on in current singing so that the re-recorded recorded clip is naturally spliced to the previously recorded clips as much as possible. The recorded clip can be a voice clip.

Figure 1:
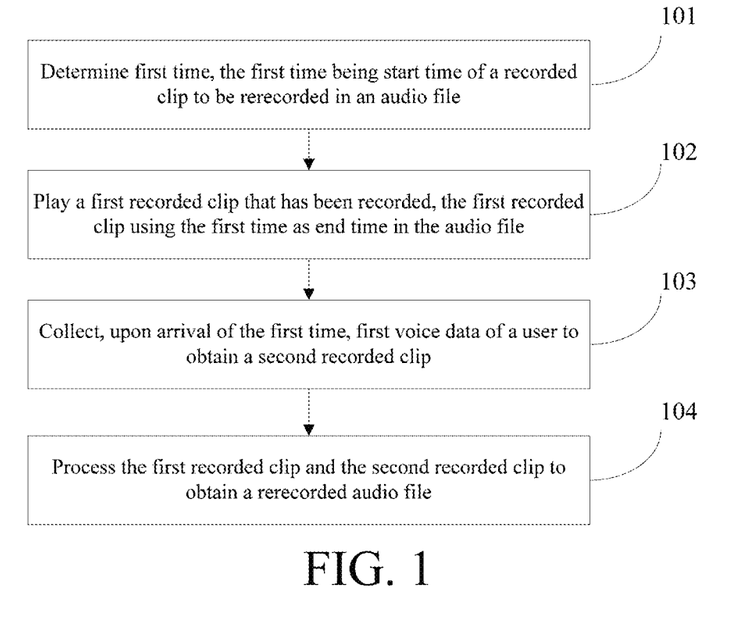
FIG. 1 is a flowchart of an audio file re-recording method provided by an embodiment of the present disclosure.

With reference to FIG. 1, the method provided by this embodiment includes:

101. determine first time, the first time being start time of a recorded clip to be re-recorded in an audio file;

102. play a first recorded clip that has been recorded, the first recorded clip using the first time as end time in the audio file;

103. upon arrival of the first time, collect first voice data of a user to obtain a second recorded clip; and 104. process the first recorded clip and the second recorded clip to obtain a re-recorded audio file.

It can be understood that the first time is not limited to an absolute time point, and may be the time relative to the start time of the audio file for indicating the playing time or the recording progress of the audio file. It can also be understood that the first time may also be represented by the position of the recorded clip to be re-recorded in the audio file.

It can be understood that the recorded clip to be re-recorded herein refers to a recorded clip failing to meet user expectations and wishing to be re-recorded according to a re-recording function provided by the recording application.

It can be understood that the term "recorded clips" used herein refers to recorded clips in the audio file including voice, these clips may include voice and may exclude voice (e.g., silent), and the "recorded clips" appearing throughout this article do not define that the clips necessarily include voice.

in the method provided by embodiments of the present disclosure, by playing clips in front of a recorded clip to be re-recorded, the user can listen to the previously recorded clips before re-recording the recorded clip to be re-recorded, in order to adjust the breath of the user, the distance between the user and the microphone, the tone and so on, and based on the collected singing data, the audio file obtained through editing and splicing by the mobile terminal has good listening effect, and the hearer is unperceivable to the spliced trace.

In another embodiment of the present disclosure, the method further includes:

collecting second voice data of the user in the process of playing the first recorded clip that has been recorded to obtain a third recorded clip; and using the second recorded clip and the third recorded clip as recorded clips recorded this time.

In another embodiment of the present disclosure, the processing the first recorded clip and the second recorded clip to obtain a re-recorded audio file includes:

acquiring a first sound spectrum corresponding to the first recorded clip, and acquiring a second sound spectrum corresponding to the second recorded clip;

determining, from the first sound spectrum, a flat start point and second time corresponding to the flat start point;

acquiring, from the second sound spectrum, a rising start point and third time corresponding to the rising start point;

In one embodiment of the present disclosure, the flat start point and the rising start point are the start point and the end point of a flat area between two continuous sound spectrums. The flat area is an area that may be determined according to a sound spectrum corresponding to lyrics and the loudness of sound and is generally between sound spectrums corresponding to two continuous sentences in the lyrics, and the loudness thereof is less than a preset threshold. The preset threshold of the loudness of sound may be −70 db. Taking FIG. 7 for example, segments S to E in the sound spectrum area are the flat area with loudness less than −70 db located between two continuous sound spectrums A and B, wherein S is the flat start point of first sound spectrum A, and E is a rising start point of second sound spectrum B.

using second time as start time to select a fourth recorded clip from the recorded clips recorded this time;

The fourth recorded clip can be selected according to the sound spectrum corresponding to lyrics and the loudness of sound, e.g., from the end of the sound spectrum corresponding to one sentence of the lyrics to the start point of an area where the loudness of sound is less than the preset threshold. The preset threshold of the loudness of sound may be −70 db.

using the third time as end time to select a fifth recorded clip from recorded clips recorded last time, the recorded clips recorded last time including the recorded clip to be re-recorded and the first recorded clip; and The selection mode of the fifth recorded clip is similar to that of the fourth recorded clip.

processing the fourth recorded clip and the fifth recorded clip to obtain a re-recorded audio file;

wherein the second time is earlier than the first time, and the first time is earlier than the third time.

In another embodiment of the present disclosure, the processing the fourth recorded clip and the fifth recorded clip to obtain a re-recorded audio file includes:

comparing a sound spectrum corresponding to the fourth recorded clip with a sound spectrum corresponding to the fifth recorded clip;

acquiring a first target sound spectrum from the sound spectrum corresponding to the fourth recorded clip, and acquiring a second target sound spectrum from the sound spectrum corresponding to the fifth recorded clip, the first target sound spectrum and the second target sound spectrum having the same start time and end time; and fitting the first target sound spectrum and the second target sound spectrum so that the fourth recorded clip and the fifth recorded clip are spliced together to obtain the re-recorded audio file.

In another embodiment of the present disclosure, the method further includes:

playing a corresponding accompaniment file in the process of playing recorded clips that have been recorded and recording the recorded clips.

All the alternative technical solutions above can be arbitrarily combined into alternative embodiments of the present disclosure. The details are not described here again.

Figure 2:
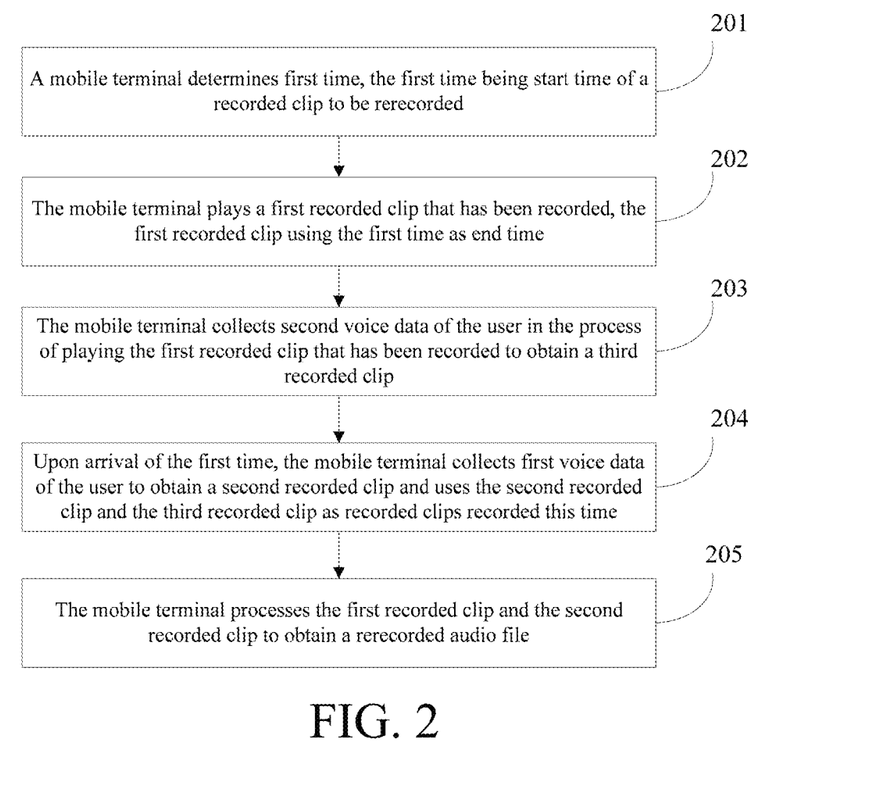
FIG. 2 is a flowchart of an audio file re-recording method provided by another embodiment of the present disclosure.

Embodiments of the present disclosure provide an audio file re-recording method. With reference to FIG. 2, the method provided by the embodiments of the present disclosure includes:

201. A mobile terminal determines first time, the first time being start time of a recorded clip to be re-recorded.

In the embodiment, the mobile terminal may be an apparatus such as a smartphone, a notebook computer, and a tablet computer; recording applications having a re-recording function are installed in the mobile terminal; based on the installed recording applications, users can record audio files they like anytime anywhere, and share the recorded audio files to friends.

In the process of recording an audio file, if the recorded clip that has been recorded fails to achieve an expected effect of the user, or the score in the recording process is low, the user can re-record the recorded clip according to the re-recording function provided by the recording application. A recorded clip to be re-recorded may be one sentence of lyrics, one paragraph and so on, and the recorded clip to be re-recorded corresponds to the start time and the end time in the audio file. This embodiment takes the start time of the recorded clip to be re-recorded being the first time for example, the first time is not absolute time, but is the time relative to the playing start time of the audio file, and can be used for representing the playing time or the recording progress of the audio file. The first time shall be less than the playing duration of the audio file, for example, the playing duration of the audio file is 4 minutes, the playing start time is 00:00, and the first time is 01:30, 02:00 and so on of the audio file. During acquisition of the playing duration and the first time of the audio file, the position of the recorded clip to be re-recorded in the audio file can also be acquired, for example, if the duration of the audio file is 4 minutes, and the first time is 02:00 of the audio file, it can be learned that the recorded clip to be re-recorded is at the midpoint of the audio file.

It should be noted that this embodiment relates to multiple recorded clips. To distinguish these different recorded clips, this embodiment calls the recorded clip that fails to achieve the expected effect of the user and needs to be re-recorded as a recorded clip to be re-recorded, the recorded clip played this time as a first recorded clip, the recorded clip recorded in the process of playing the first recorded clip as a third recorded clip, a recorded clip re-recorded this time as a second recorded clip, the recorded clip selected from the recorded clips recorded this time as a fourth recorded clip, and the recorded clip selected from the recorded clips recorded last time as a fifth recorded clip.

202. The mobile terminal plays a first recorded clip that has been recorded, the first recorded clip using the first time as end time.

Figure 3:
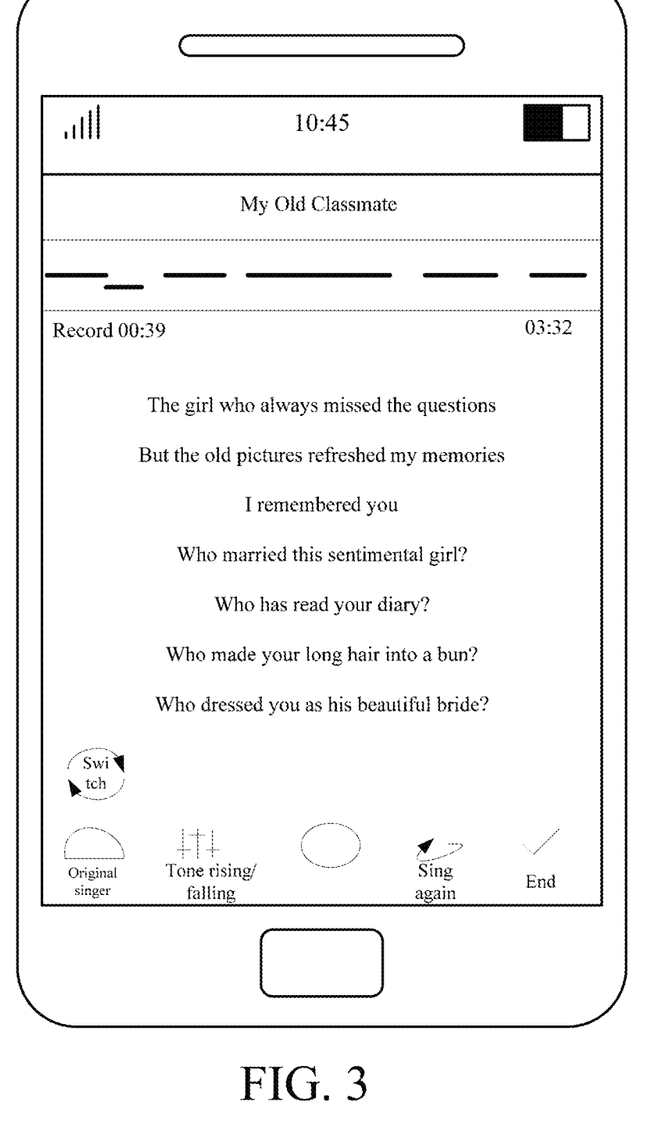
FIG. 3 is a schematic diagram of an audio file recording interface provided by another embodiment of the present disclosure.

Generally, the user would casually adjust the breath and emotion during singing to match the currently sung lyrics, which causes that the user is hard to capture the breath and emotion used in singing the previous sentence in the lyrics in the process of re-recording the recorded clip to be re-recorded, rendering the listening effect of the re-recorded audio file poor. To improve the listening effect of the re-recorded audio file, after the recorded clip to be re-recorded is determined, the mobile terminal further determines a first recorded clip to be played from the recorded audio file according to the start time of the recorded clip to be re-recorded, the first recorded clip shall use the first time as the end time. The first recorded clip may be several sentences or several paragraphs in the lyrics in front of the recorded clip to be re-recorded, and this embodiment does not specifically define the length of the first recorded clip. To make the re-recorded audio file more natural and the playing effect better, when determining the first recorded clip, the mobile terminal can select the length of the first recorded clip to be longer as far as possible. Taking the recording of the song "My Old Classmate" for example, with reference to FIG. 3, FIG. 3 shows a recording interface of the song "My Old Classmate", if the user wants to re-record the lyrics "to remember my old classmate", i.e., the recorded clip to be re-recorded is "to remember my old classmate", and it is acquired that the start time of the lyrics is 00:39 of the audio file, the mobile terminal can use "the girl who always missed the questions, but the old pictures refreshed my memories" as the first recorded clip.

Then, the mobile terminal plays the first recorded clip that has been recorded through a playback device or a monitoring device such as an earphone or a loudspeaker. To restore the previous recording scene to the utmost extent, in the process of playing the first recorded clip that has been recorded, the mobile terminal also plays, according to the time corresponding to the first recorded file, an accompaniment file corresponding to the time; the playing duration of the accompaniment file is the same as that of the audio file, and the recorded clips in the audio file have one-to-one correspondence to the accompaniment clips in the accompaniment file. For example, the start time of the first recorded clip is 01:06 of the audio file, and the end time is 02:13, the mobile terminal also synchronously plays the accompaniment file corresponding to the first recorded clip while playing the first recorded clip through the microphone.

203. The mobile terminal collects second voice data of the user to obtain a third recorded clip in the process of playing the first recorded clip that has been recorded.

When the mobile terminal plays the first recorded clip that has been recorded, the user can sing the first recorded clip again following the first recorded clip and the corresponding accompaniment file, and at this time, the apparatus such as the microphone collects second voice data of the user and stores the collected second voice data in a storage medium such as a cache to obtain a third recorded clip. The third recorded clip is an audio clip collected by a sound collection apparatus during the period from the start time of the first recorded clip to the first time, the third recorded clip may have the same content as the first recorded clip, and may be only a part of the first recorded clip.

204. Upon arrival of the first time, the mobile terminal collects first voice data of the user to obtain a second recorded clip and uses the second recorded clip and the third recorded clip as recorded clips recorded this time.

Upon arrival of the end time, i.e., the first time, of the first recorded clip, the mobile terminal collects first voice data of the user through the apparatus such as a microphone and stores the collected first voice data in a storage medium such as a cache to obtain a second recorded clip. The second recorded clip has the same audio content as the recorded clip to re-recorded, i.e., the same lyrics in the audio file of the second recorded clip corresponding to the recorded clip to be re-recorded.

At this time, in this re-recording process, the mobile terminal records two recorded clips in total, i.e., a third recorded clip and a second recorded clip, the mobile terminal uses the third recorded clip and the second recorded clip as recorded clips recorded this time.

205. The mobile terminal processes the first recorded clip and the second recorded clip to obtain a re-recorded audio file.

By means of steps 201-204, the mobile terminal acquires the second recorded clip that is relatively satisfactory to the user; however, the second recorded clip is not connected to the first recorded clip but is connected to the third recorded clip, and the first recorded clip is not connected to the second recorded clip but is connected to the recorded clip to be re-recorded, and at this time, the mobile terminal needs to process the first recorded clip and the second recorded clip so that the first recorded clip and the second recorded clip can be naturally spliced together to obtain a re-recorded audio file.

The mobile terminal can adopt the following steps 2051-2056 for processing the first recorded clip and the second recorded clip.

2051. The mobile terminal acquires a first sound spectrum corresponding to the first recorded clip, and acquires a second sound spectrum corresponding to the second recorded clip.

Figure 4:
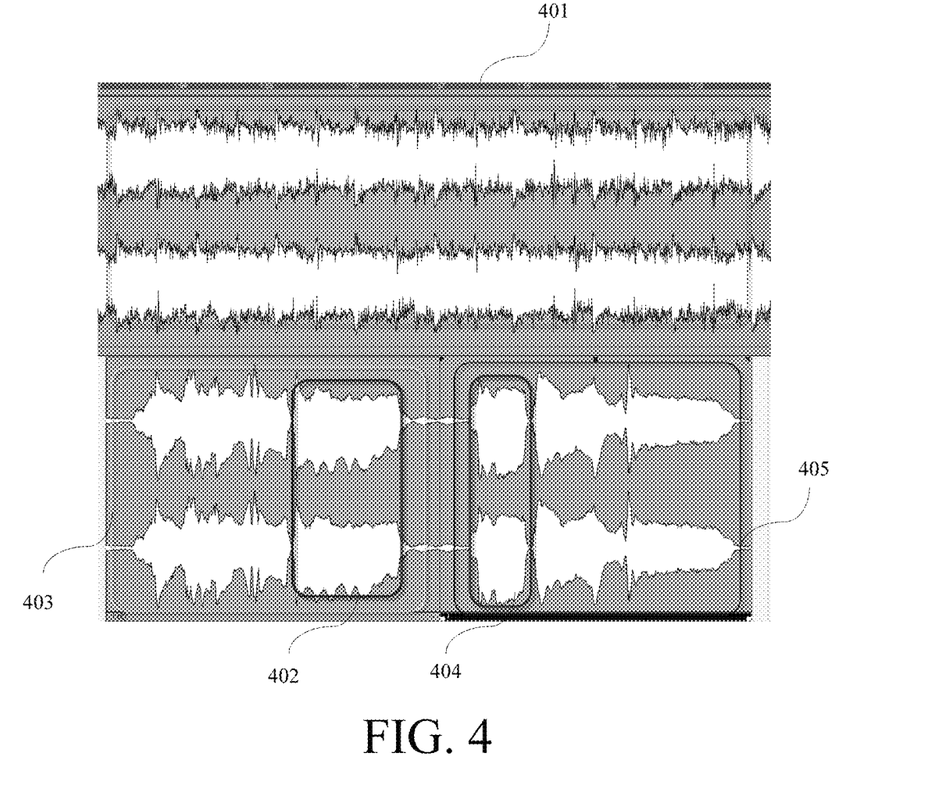
FIG. 4 is a schematic diagram of a sound spectrum provided by another embodiment of the present disclosure.

It is well known that transmission of sound in the air can form sound waves, each sound wave corresponds to a sound spectrum. This embodiment exactly processes the first recorded clip and the second recorded clip based on the sound spectrum corresponding to the first recorded clip and the sound spectrum corresponding to the second recorded clip. To facilitate subsequent narration, this embodiment calls the sound spectrum corresponding to the first recorded clip as a first sound spectrum, and calls the sound spectrum corresponding to the second recorded clip as a second sound spectrum. With reference to FIG. 4, 401 in FIG. 4 is the sound spectrum corresponding to the accompaniment file, 402 is the first sound spectrum corresponding to the first recorded clip, 403 is the sound spectrum corresponding to a recorded clip in front of the first recorded clip, 404 is the sound spectrum corresponding to the recorded clip to be re-recorded, and 405 is the sound spectrum corresponding to the recorded clip that has been recorded by using the recorded clip to be re-recorded as the start point.

In this embodiment, when acquiring the first sound spectrum corresponding to the first recorded clip, the mobile terminal can input the first recorded clip into an oscilloscope to obtain the first sound spectrum corresponding to the first recorded clip. When acquiring the second sound spectrum corresponding to the second recorded clip, the mobile terminal can input the second recorded clip into the oscilloscope to obtain the second sound spectrum corresponding to the second recorded clip.

The aforementioned contents merely relate to an approach of acquiring the first sound spectrum corresponding to the first recorded clip and the second sound spectrum corresponding to the second recorded clip, and in the practical application, other approaches can also be adopted to acquire the first sound spectrum corresponding to the first recorded clip and the second sound spectrum corresponding to the second recorded clip. The details are not described in this embodiment again.

2052. The mobile terminal determines, from the first sound spectrum, a flat start point and second time corresponding to the flat start point.

Figure 5:
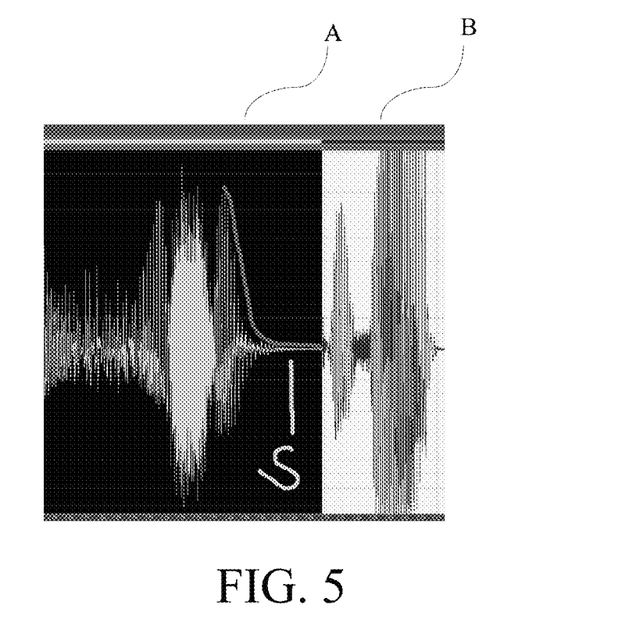
FIG. 5 is a schematic diagram of a sound spectrum provided by another embodiment of the present disclosure.

In the process of completing singing of one sentence of the lyrics, the sound spectrum corresponding to the recorded clip collected by the apparatus such as the microphone becomes stable, and the amplitude of the sound spectrum decreases gradually. From the start point where the sound spectrum becomes stable, the recorded clip collected by the apparatus such as the microphone is generally only the breath of the user and contains no voice data. This embodiment calls the start point where the sound spectrum becomes stable as a flat start point, and calls the time corresponding to the flat start point as second time, wherein the second time may be 01:00 of the audio file, 03:00 of the audio file and so on. This embodiment does not specifically define the length of the second time, provided that the second time is ensured to be earlier than the first time. With reference to FIG. 5, A in FIG. 5 is the first sound spectrum corresponding to the first recorded clip, B is the second sound spectrum corresponding to the recorded clip to be re-recorded, S is the flat start point in the first sound spectrum, and the time corresponding to S is set as t1.

2053. The mobile terminal determines, from the second sound spectrum, a rising start point and third time corresponding to the rising start point.

Figure 6:
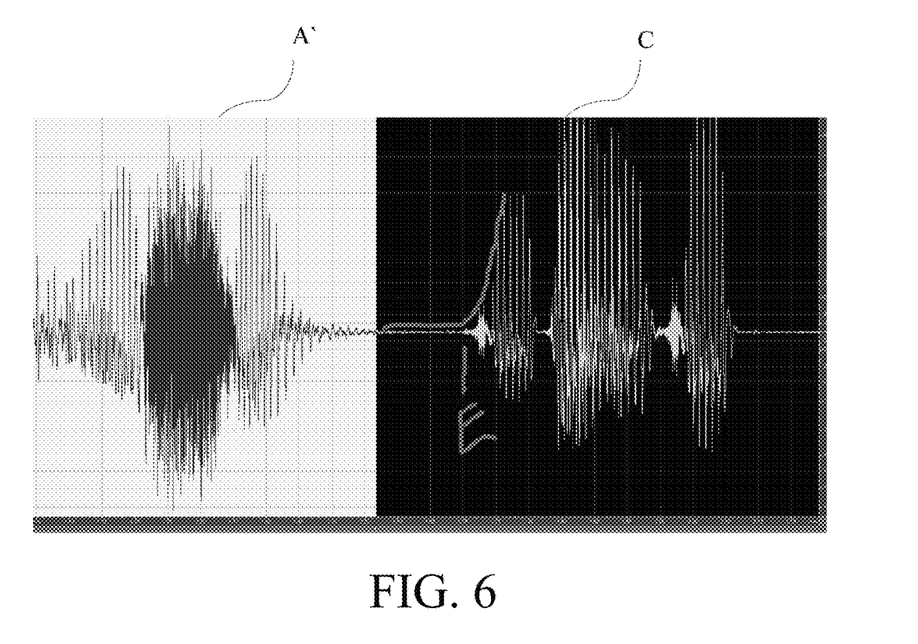
FIG. 6 is a schematic diagram of a sound spectrum provided by another embodiment of the present disclosure.

In the process of singing one sentence of the lyrics, a sound spectrum corresponding to the recorded clip collected by the apparatus such as the microphone rises gradually, and the amplitude of the sound spectrum increases gradually. From the start point where the sound spectrum rises, the recorded clip collected by the apparatus such as the microphone contains the voice data of the user. This embodiment calls the start point where the sound spectrum rises as a rising start point, and calls the time corresponding to the rising start point as third time, wherein the third time may be 03:00 of the audio file, 05:00 of the audio file and so on. This embodiment does not specifically define the length of the third time, provided that the first time is ensured to be earlier than the third time. With reference to FIG. 6, A' in FIG. 6 is the sound spectrum corresponding to the third recorded clip, C is the sound spectrum corresponding to the second recorded clip, E is the rising start point in the second sound spectrum, and the time corresponding to E is set as t2.

2054. The mobile terminal uses the second time as start time to select a fourth recorded clip from the recorded clips recorded this time.

To acquire an audio file with better listening effect, the mobile terminal would store collected recorded clips, i.e., both the recorded clips collected last time and the recorded clips collected this time, in the storage medium such as the cache. To naturally splice the first recorded clip and the second recorded clip together, the mobile terminal can splice the parts containing no voice data in the first recorded clip and the second recorded clip.

Figure 7:
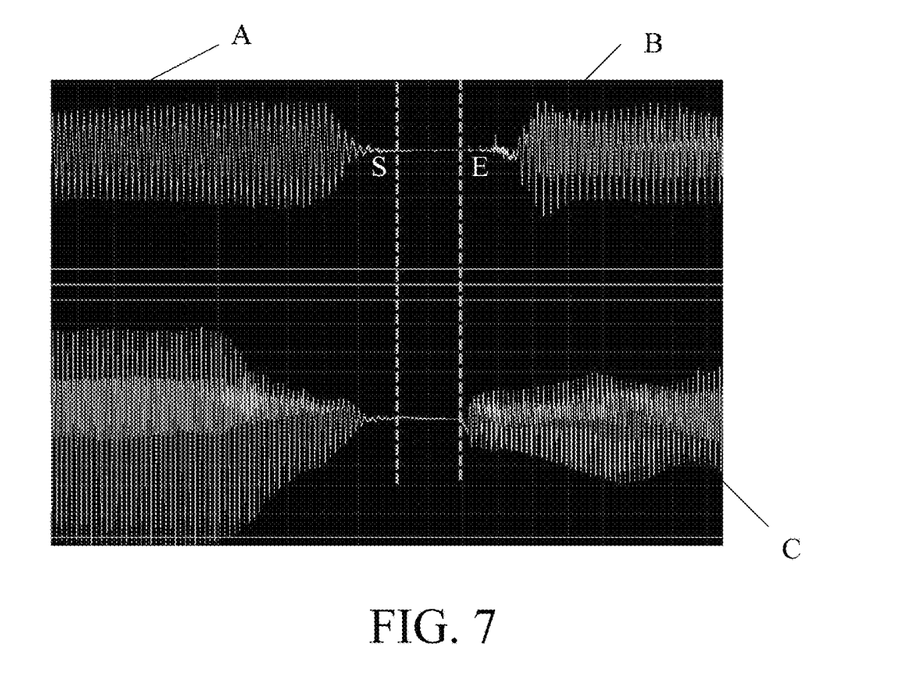
FIG. 7 is a schematic diagram of a sound spectrum provided by another embodiment of the present disclosure.

To achieve seamless splicing better, the mobile terminal can use the second time as the start time to select a fourth recorded clip from the recorded clips recorded this time, the fourth recorded clip including a part of the third recorded clip and the second recorded clip; the part of the third recorded clip uses the second time as the start time and the first time as the end time. With reference to FIG. 7, the fourth recorded clip includes a part of the third recorded clip and the second recorded clip C.

2055. The mobile terminal uses the third time as end time to select a fifth recorded clip from recorded clips recorded last time, the recorded clips recorded last time including the recorded clip to be re-recorded and the first recorded clip.

To splice the first recorded clip and the second recorded clip together better, the mobile terminal also uses the third time as end time to select a fifth recorded clip from recorded clips recorded last time; the recorded clips recorded last time include the recorded clip to be re-recorded and the first recorded clip. Accordingly, the fifth recorded clip includes the first recorded clip and a part of the recorded clip to be re-recorded; the part of the recorded clip to be re-recorded uses the first time as the start time and the third time as the end time. With reference to FIG. 7, the fifth recorded clip includes the first recorded clip A and a part of the recorded clip to be re-recorded.

2056. The mobile terminal processes the fourth recorded clip and the fifth recorded clip to obtain a re-recorded audio file.

The mobile terminal can adopt the following steps a-c for processing the fourth recorded clip and the fifth recorded clip to obtain a re-recorded audio file.

a. The mobile terminal compares a sound spectrum corresponding to the fourth recorded clip with a sound spectrum corresponding to the fifth recorded clip.

In general, the sound spectrum of the recorded clip can reflect the amplitude of the recorded clip at a certain moment, the mobile terminal can acquire the fourth recorded clip and a part with small amplitude of the fifth recorded clip through comparing the sound spectrum corresponding to the fourth recorded clip with the sound spectrum corresponding to the fifth recorded clip, the part with small amplitude does not contain voice, and splicing the fourth recorded clip and the fifth recorded clip at the part does not influence the integrity of the entire audio file.

b. The mobile terminal acquires a first target sound spectrum from the sound spectrum corresponding to the fourth recorded clip, and acquires a second target sound spectrum from the sound spectrum corresponding to the fifth recorded clip.

The mobile obtain can acquire a first target sound spectrum from the sound spectrum corresponding to the fourth recorded clip and acquire a second target sound spectrum from the sound spectrum corresponding to the fifth recorded clip through comparing the sound spectrum corresponding to the fourth recorded clip with the sound spectrum corresponding to the fifth recorded clip. The first target sound spectrum and the second target sound spectrum have the same start time and end time, the first target sound spectrum is the part with small amplitude of the fourth recorded clip, and the second target sound spectrum is the part with small amplitude of the fifth recorded clip.

c. The mobile terminal fits the first target sound spectrum and the second target sound spectrum so that the fourth recorded clip and the fifth recorded clip are spliced together to obtain the re-recorded audio file.

Figure 8:
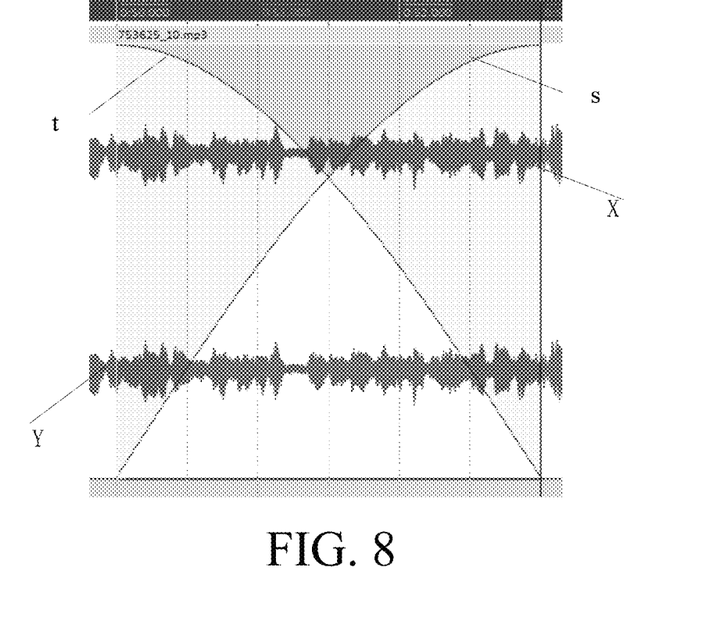
FIG. 8 is a schematic diagram of fitting a first target sound spectrum and a second target sound spectrum provided by another embodiment of the present disclosure.

When fitting the first target sound spectrum and the second target sound spectrum, the mobile terminal can select a linear function, a quadratic function, a specified parameter and so on as weighted values of the first target sound spectrum and the second target sound spectrum, and fits the amplitude of the first target sound spectrum and the amplitude of the second target sound spectrum based on the selected weight values. Through the fitting, the fourth recorded clip and the fifth recorded clip can be spliced together, and then the first recorded clip and the second recorded clip can also spliced together, so that the re-recorded audio file is obtained. To ensure the spliced fourth recorded clip and fifth recorded clip to be more natural, when selecting weighted values for the first target sound spectrum and the second target sound spectrum, the mobile terminal can select the same value or function for the weighted value of the first target sound spectrum and the weighted value of the second target sound spectrum. With reference to FIG. 8, FIG. 8 is a schematic diagram of fitting the first target sound spectrum and the second target sound spectrum, wherein X is the first target sound spectrum, Y is the second target sound spectrum, s and t are quadratic functions, s is the weighted value corresponding to the first target sound spectrum, and t is the weighted value corresponding to the second target sound spectrum. Based on the quadratic functions s and t, the mobile terminal can connect the fourth recorded clip and the fifth recorded clip smoothly through fitting the first target sound spectrum and the second target sound spectrum.

It should be noted that description is made above by taking the mobile terminal only collecting the voice data of the user in the process of re-recording the audio file for example, in the practical application, the mobile terminal may also simultaneously collect voice data and accompaniment data, and integrate the collected voice data and accompaniment data into a re-recorded sound spectrum file.

By means of the method provided by embodiments of the present disclosure, there is no need to repeatedly record a sound spectrum file, by playing recorded clips in front of the recorded clip to be re-recorded, the user can listen to the previously recorded clips before re-recording the recorded clip to be re-recorded, in order to adjust the breath of the user, the distance between the user and the microphone, the tone and so on. Based on the collected singing data, the audio file obtained through editing and splicing by the mobile terminal has good listening effect, and the hearer is unperceivable to the spliced trace.

Figure 9:
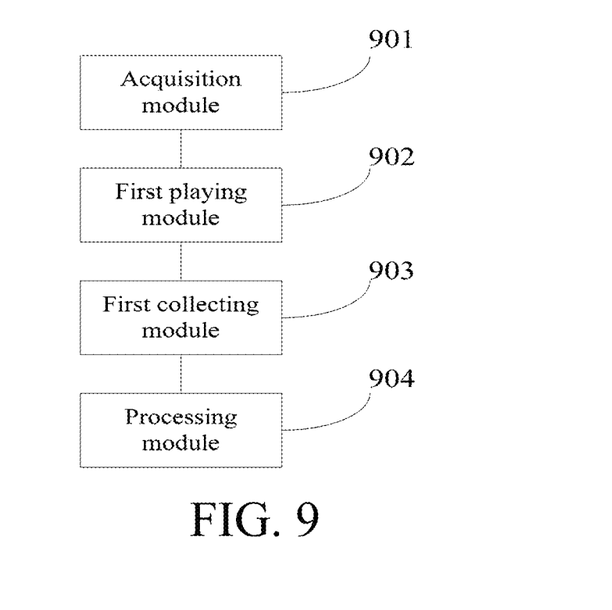
FIG. 9 is a schematic structural diagram of an audio file re-recording device provided by another embodiment of the present disclosure.

With reference to FIG. 9, embodiments of the present disclosure provide a schematic structural diagram of an audio file re-recording device. The device includes:

an acquisition module 901, configured to determine first time, the first time being start time of a recorded clip to be re-recorded in an audio file;

a first playing module 902, configured to play a first recorded clip that has been recorded, the first recorded clip using the first time as end time;

a first collecting module 903, configured to collect, upon arrival of the first time, first voice data of a user to obtain a second recorded clip; and a processing module 904, configured to process the first recorded clip and the second recorded clip to obtain a re-recorded audio file.

In another embodiment of the present disclosure, the device further includes:

a second collecting module, configured to collect second voice data of the user in the process of playing the first recorded clip that has been recorded to obtain a third recorded clip, and use the second recorded clip and the third recorded clip as recorded clips recorded this time.

In another embodiment of the present disclosure, the processing module 904 is configured to: acquire a first sound spectrum corresponding to the first recorded clip and acquire a second sound spectrum corresponding to the second recorded clip; acquire a flat start point and second time corresponding to the flat start time from the first sound spectrum; acquire a rising start time and third time corresponding to the rising start time from the second sound spectrum; use the second time as start time to select a fourth recorded clip from the recorded clips recorded this time; use the third time as end time to select a fifth recorded clip from the recorded clips recorded last time, the recorded clips recorded last time including a recorded clip to be re-recorded and the first recorded clip; and process the fourth recorded clip and the fifth recorded clip to obtain a re-recorded audio file;

wherein the second time is earlier than the first time, and the first time is earlier than the third time.

In another embodiment of the present disclosure, the processing module 904 is further configured to: compare a sound spectrum corresponding to the fourth recorded clip with a sound spectrum corresponding to the fifth recorded clip; acquire a first target sound spectrum from the sound spectrum corresponding to the fourth recorded clip, and acquire a second target sound spectrum from the sound spectrum corresponding to the fifth recorded clip, the first target sound spectrum and the second target sound spectrum having the same start time and end time; and fit the first target sound spectrum and the second target sound spectrum so that the fourth recorded clip and the fifth recorded clip are spliced together to obtain the re-recorded audio file.

In another embodiment of the present disclosure, the device further includes:

a second playing module, configured to play a corresponding accompaniment file in the process of playing recorded clips that have been recorded and recording the recorded clips.

In conclusion, by means of the device provided by embodiments of the present disclosure, there is no need to repeatedly record a sound spectrum file, by playing recorded clips in front of the recorded clip to be re-recorded, the user can listen to the previously recorded clips before re-recording the recorded clip to be re-recorded, in order to adjust the breath of the user, the distance between the user and the microphone, the tone and so on. Based on the collected singing data, the audio file obtained through editing and splicing by the mobile terminal has good listening effect, and the hearer is unperceivable to the spliced trace.

Figure 10:
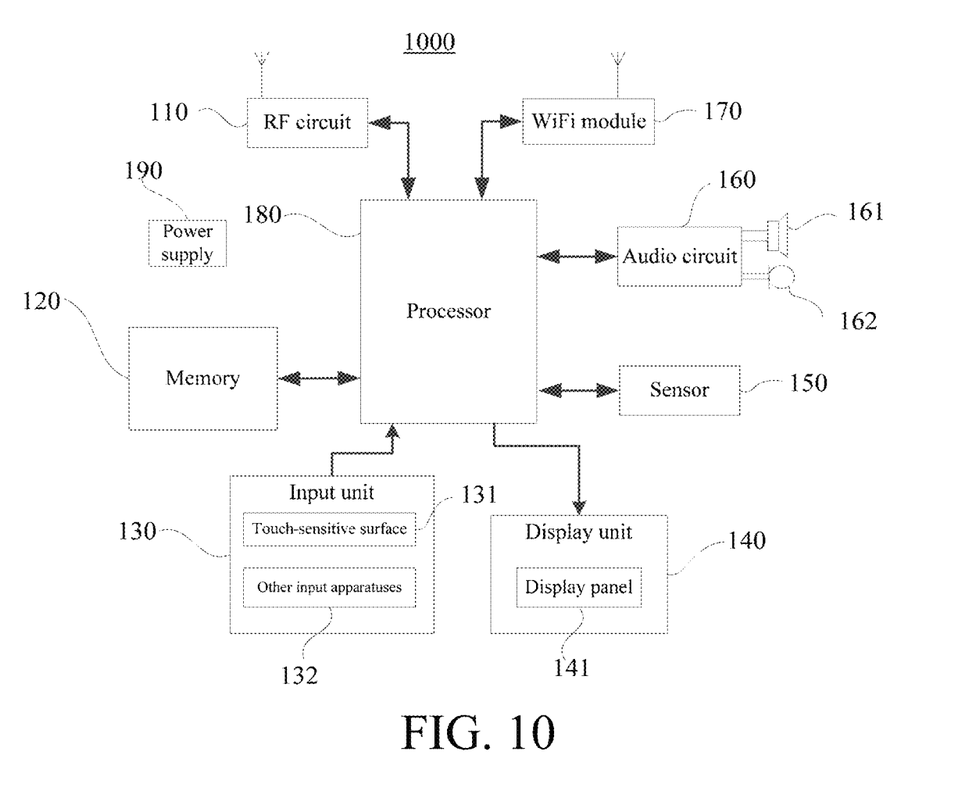
FIG. 10 is a schematic structural diagram of an audio file re-recording terminal provided by another embodiment of the present disclosure.

With reference to FIG. 10, FIG. 10 is a schematic structural diagram of an audio file re-recording terminal involved in embodiments of the present disclosure. The terminal can be configured to implement the audio file re-recording method provided in the aforementioned embodiments. Specifically speaking:

A terminal 1000 may include components such as a Radio Frequency (RF) circuit 110, a memory 120 including one or more computer readable storage media, an input unit 130, a display unit 140, a sensor 150, an audio circuit 160, a Wireless Fidelity (WiFi) module 170, a processor 180 including one or more processing cores, and a power supply 190. A person of ordinary skill in the art can understand that the terminal structure shown in FIG. 10 does not form a limitation to the terminal, and the terminal may include more or less components than those shown in the drawing, or combines some components, or adopts different component arrangements. Wherein:

The RF circuit 110 may be configured to receive and send signals in the information reception and transmission or call process, particularly, receive downlink information of a base station and then forward same to the one or more processor 180 for processing, and moreover, send involved uplink data to the base station. In general, the RF circuit 110 includes, but not limited to, an antenna, at least one amplifier, a tuner, one or more oscillators, a Subscriber Identity Module (SIM) card, a transceiver, a coupler, a Low Noise Amplifier (LNA), a duplexer and so on. In addition, the RF circuit 110 can also communicate with a network and other apparatus through wireless communication. The wireless communication can use any communication standard or protocol, including, but not limited to, Global System of Mobile communication (GSM), General Packet Radio Service (GPRS), Code Division Multiple Access (CDMA), Wideband Code Division Multiple Access (WCDMA), Long Term Evolution (LTE), e-mail, Short Messaging Service (SMS) and so on.

The memory 120 may be configured to store software programs and modules, and the processor 180 executes various functional applications and data processing through running the software applications and modules stored in the memory 120. The memory 120 may mainly include a program storage area and a data storage area, wherein the program storage area can store operating systems, an application program required by at least one function (such as, a sound playing function and an image playing function) and so on, and the data storage area can store data (such as, audio data and an address book) created according to the utilization of the terminal 1000 and so on. In addition, the memory 120 may include a high-speed random access memory, and may also include a nonvolatile memory, such as, at least one disk storage apparatus, a flash memory, or other volatile solid-state storage apparatus. Accordingly, the memory 120 may also include a memory controller, configured to provide access of the processor 180 and the input unit 130 to the memory 120.

The input unit 130 may be configured to receive inputted numerical or character information, and generate keyboard, mouse, operating rod, optical or trackball signal input associated with user settings and functional control. Specifically, the input unit 130 may include a touch-sensitive surface 131 and other input apparatus 132. The touch-sensitive surface 131 is also called a touch display screen or a touchpad, and can collect touch operations of the user on or near it (e.g., operations of any suitable object or accessory such as a finger of the user or a stylus on the touch-sensitive surface 131 or near the touch-sensitive surface 131), and drive a corresponding connecting apparatus according to a pre-set program. Optionally, the touch-sensitive surface 131 may include two parts: a touch detection apparatus and a touch controller, wherein the touch detection apparatus detects a touch orientation of the user, detects a signal produced by the touch operation, and transmits the signal to the touch controller; the touch controller receives touch information from the touch detection apparatus, converts same into contact coordinates to be sent to the processor 180, and can receive and execute a command sent by the processor 180. In addition, the touch-sensitive surface 131 can be achieved by various types of sound waves such as a resistive sound wave, a capacitive sound wave, an infrared sound wave and a surface sound wave. In addition to the touch-sensitive surface 131, the input unit 130 may also include other input apparatus 132. Specifically, the other input apparatus 132 may include, but not limited to, one or more of a physical keyboard, function keys (such as a volume control key and an on/off key), a trackball, a mouse, an operating rod and so on.

The display unit 140 may be configured to display information inputted by the user or information provided to the user and various graphic user interfaces of the terminal 1000. These graphic user interfaces may consist of graphs, texts, icons, videos, and any combination thereof. The display unit 140 may include a display panel 141. Optionally, the display panel 141 may be configured in the form of a Liquid Crystal Display (LCD), an Organic Light-Emitting Diode (OLED) and so on. Furthermore, the touch-sensitive surface 131 can cover the display panel 141, and when the touch-sensitive surface 131 detects a touch operation on or near it, the touch operation is transmitted to the processor 180 to determine the type of a touch event, and then the processor 180 provides corresponding visual output on the display panel 141 according to the type of the touch event. Although in FIG. 10, the touch-sensitive surface 131 and the display panel 141 serve as two independent components to achieve input and output functions, in some embodiments, the touch-sensitive surface 131 and the display panel 141 can be integrated to achieve the input and output functions.

The terminal 1000 may also include at least one sensor 150, e.g., an optical sensor, a motor sensor and other sensors. Specifically, the optical sensor may include an ambient light sensor and a proximity sensor, wherein the ambient light sensor can adjust the brightness of the display panel 141 according to the intensity of the ambient light, and the proximity sensor can turn off the display panel 141 and/or backlight as the terminal 1000 moves to the ear. As one of motion sensors, a gravity acceleration sensor can detect the magnitude of an acceleration in each direction (generally the tri-axial direction), can detect the strength and direction of the gravity in a static state, and can be configured to identify applications of mobile phone gestures (e.g., portrait and landscape orientation switching, related games, magnetometer gesture calibration), vibration identification related functions (e.g., a pedometer and knocking) and so on. Regarding other sensors such as a gyroscope, a barometer, a hygrometer, a thermometer and an infrared sensor that can be further configured in the terminal 1000, the details are not described here again.

The audio circuit 160, a loudspeaker 161, and a microphone 162 can provide audio interfaces between the user and the terminal 1000. The audio circuit 160 can transmit an electric signal converted from the received audio data to the loudspeaker 161, and the loudspeaker 161 converts the electric signal into a sound signal to output; on the other hand, the microphone 162 converts the collected sound signal into an electric signal, and the audio circuit 160 receives and converts the electric signal into audio data to output to the processor 180 for processing, and then the processed audio data is sent to, for example, another terminal via the RF circuit 110, or the audio data is outputted to the memory 120 for further processing. The audio circuit 160 may also include an earplug jack through which a peripheral earphone communicates with the terminal 1000.

WiFi belongs to the short-distance wireless transmission technology. The terminal 1000 can help the user to receive and send e-mails, browse webpages, access streaming media and so on through the WiFi module 170. WiFi provides wireless broadband Internet access for the user. Although FIG. 10 shows the WiFi module 170, it can be understood that the WiFi module 170 is not a necessary component of the terminal 1000, and absolutely can be omitted as needed without changing the scope of the nature of invention.

The processor 180 is a control center of the terminal 1000, is connected to each part of the entire mobile phone by using various interfaces and circuits, and executes various functions and processing data of the terminal 1000 through running or executing the software programs and/or modules stored in the memory 120 and invoking data stored in the memory 120 so as to monitor the mobile phone. Optionally, the processor 180 may include one or more processing cores. Optionally, the processor 180 may be integrated with an application processor and a modem processor, wherein the application processor mainly processes an operating system, user interfaces, application programs and so on, and the modem processor mainly processes wireless communication. It can be understood that the modem processor likewise may not be integrated into the processor 180.

The terminal 1000 further includes a power supply 190 (e.g., a battery) supplying power to each component. Optionally, the power supply can be logically connected to the processor 180 through a power management system, so as to achieve functions of charging management, discharging management, power consumption management and so on through the power management system. The power supply 190 may also include any component such as one or more direct-current or alternating-current power supplies, a recharging system, a power failure detection circuit, a power converter or inverter, and a power state indicator.

Although not shown, the terminal 1000 may also include a camera, a Bluetooth module and so on. The details are not described here again. Specifically, in this embodiment, the display unit of the terminal 1000 is a touch screen monitor.

The terminal 1000 further includes a memory and one or more programs, wherein the one or more programs are stored in the memory and are configured to be executed by one or more processors. The one or more programs include instructions for executing the following operations:

determining first time, the first time being start time of a recorded clip to be re-recorded in an audio file;

playing a first recorded clip that has been recorded, the first recorded clip using the first time as end time in the audio file;

upon arrival of the first time, collecting first voice data of a user to obtain a second recorded clip; and processing the first recorded clip and the second recorded clip to obtain a re-recorded audio file.

Assuming that the aforementioned contents relate to a first possible implementation mode, in a second possible implementation mode provided based on the first possible implementation mode, the memory of the terminal further includes instructions for executing the following operations:

collecting second voice data of the user in the process of playing the first recorded clip that has been recorded to obtain a third recorded clip; and using the second recorded clip and the third recorded clip as recorded clips recorded this time.

Assuming that the aforementioned contents relate to the second possible implementation mode, in a third possible implementation mode provided based on the second possible implementation mode, the memory of the terminal further includes instructions for executing the following operations:

processing the first recorded clip and the second recorded clip to obtain a re-recorded audio file, including:

acquiring a first sound spectrum corresponding to the first recorded clip, and acquiring a second sound spectrum corresponding to the second recorded clip;

determining, from the first sound spectrum, a flat start point and second time corresponding to the flat start point in the audio file;

determining, from the second sound spectrum, a rising start point and third time corresponding to the rising start point in the audio file;

using the second time as start time to select a fourth recorded clip from the recorded clips recorded this time;

using the third time as end time to select a fifth recorded clip from recorded clips recorded last time, the recorded clips recorded last time comprising the recorded clip to be re-recorded and the first recorded clip; and processing the fourth recorded clip and the fifth recorded clip to obtain a re-recorded audio file;

wherein the second time is earlier than the first time, and the first time is earlier than the third time.

Assuming that the aforementioned contents relate to the third possible implementation mode, in a fourth possible implementation mode provided based on the third possible implementation mode, the memory of the terminal further includes instructions for executing the following operations:

processing the fourth recorded clip and the fifth recorded clip to obtain a re-recorded audio file, including:

comparing a sound spectrum corresponding to the fourth recorded clip with a sound spectrum corresponding to the fifth recorded clip;

acquiring a first target sound spectrum from the sound spectrum corresponding to the fourth recorded clip, and acquiring a second target sound spectrum from the sound spectrum corresponding to the fifth recorded clip, the first target sound spectrum and the second target sound spectrum having the same start time and end time; and fitting the first target sound spectrum and the second target sound spectrum so that the fourth recorded clip and the fifth recorded clip are spliced together to obtain the re-recorded audio file.

Assuming that the aforementioned contents relate to the fourth possible implementation mode, in a fifth possible implementation mode provided based on the fourth possible implementation mode, the memory of the terminal further includes an instruction for executing the following operation:

playing a corresponding accompaniment file in the process of playing recorded clips that have been recorded and recording the recorded clips.

According to the terminal provided by embodiments of the present disclosure, by playing recorded clips in front of a recorded clip to be re-recorded, the user can listen to the previously recorded clips before re-recording the recorded clip to be re-recorded, in order to adjust the breath of the user, the distance between the user and the microphone, the tone and so on. Based on the collected singing data, the audio file obtained through editing and splicing by the mobile terminal has good listening effect, and the hearer is unperceivable to the spliced trace.

Embodiments of the present disclosure further provide a non-transitory computer readable storage medium. The computer readable storage medium can be a computer readable storage medium included in the memory in the aforementioned embodiment, and can also be a computer readable storage medium that independently exists and is not assembled in the terminal. The computer readable storage medium stores one or more programs, which are used by one or more processors to re-record an audio file through the following steps:

determining first time, the first time being start time of a recorded clip to be re-recorded in an audio file;

playing a first recorded clip that has been recorded, the first recorded clip using the first time as end time in the audio file;

upon arrival of the first time, collecting first voice data of a user to obtain a second recorded clip; and processing the first recorded clip and the second recorded clip to obtain a re-recorded audio file.

Assuming that the aforementioned contents relate to a first possible implementation mode, in a second possible implementation mode provided based on the first possible implementation mode, the memory of the terminal further includes instructions for executing the following operations:

collecting second voice data of the user in the process of playing the first recorded clip that has been recorded to obtain a third recorded clip; and using the second recorded clip and the third recorded clip as recorded clips recorded this time.

Assuming that the aforementioned contents relate to the second possible implementation mode, in a third possible implementation mode provided based on the second possible implementation mode, the memory of the terminal further includes instructions for executing the following operations:

acquiring a first sound spectrum corresponding to the first recorded clip, and acquiring a second sound spectrum corresponding to the second recorded clip;

acquiring, from the first sound spectrum, a flat start point and second time corresponding to the flat start point;

acquiring, from the second sound spectrum, a rising start point and third time corresponding to the rising start point;

using the second time as start time to select a fourth recorded clip from the recorded clips recorded this time;

using the third time as end time to select a fifth recorded clip from recorded clips recorded last time, the recorded clips recorded last time comprising the recorded clip to be re-recorded and the first recorded clip; and processing the fourth recorded clip and the fifth recorded clip to obtain a re-recorded audio file;

wherein the second time is earlier than the first time, and the first time is earlier than the third time.

Assuming that the aforementioned contents relate to the third possible implementation mode, in a fourth possible implementation mode provided based on the third possible implementation mode, the memory of the terminal further includes instructions for executing the following operations:

comparing a sound spectrum corresponding to the fourth recorded clip with a sound spectrum corresponding to the fifth recorded clip;

acquiring a first target sound spectrum from the sound spectrum corresponding to the fourth recorded clip, and acquiring a second target sound spectrum from the sound spectrum corresponding to the fifth recorded clip, the first target sound spectrum and the second target sound spectrum having the same start time and end time; and fitting the first target sound spectrum and the second target sound spectrum so that the fourth recorded clip and the fifth recorded clip are spliced together to obtain the re-recorded audio file.

Assuming that the aforementioned contents relate to the fourth possible implementation mode, in a fifth possible implementation mode provided based on the fourth possible implementation mode, the memory of the terminal further includes an instruction for executing the following operation:

playing a corresponding accompaniment file in the process of playing recorded clips that have been recorded and recording the recorded clips.

It should be noted that: when re-recording an audio file, the audio file re-recording device provided by the aforementioned embodiments are exemplified by division of the various function modules above. In the practical application, the function allocations above can be achieved by different function modules as needed. That is, the internal structure of the audio file re-recording device is divided into different function modules to achieve all or some of the functions described above. In addition, the audio file re-recording device provided by the aforementioned embodiment and the audio file re-recording method embodiment belong to the same concept. Please refer to the method embodiment for the specific implementation process of the audio file re-recording device. The details are not described here again.

A person of ordinary skill in the art can understand that all or some of steps of the aforementioned embodiments can be achieved by hardware or by programs through instructing related hardware. The programs can be stored in a computer readable storage medium. The above-mentioned storage medium can be a read-only memory, a magnetic disk or optical disk and so on.

The above descriptions are merely preferred embodiments of the present disclosure and are not intended to limit the present disclosure. Any modification, equivalent replacement, or improvement made within the spirit and principle of the present disclosure shall fall within the scope of protection of the present disclosure.

The invention claimed is:

1. An audio file re-recording method performed at a terminal having one or more processors and memory storing a plurality of program instructions be executed by the one or more processors, the method comprising:
   determining a first time, the first time being a start time of a recorded clip to be re-recorded in an audio file;
   playing a first recorded clip in the audio file that has been recorded, the first recorded clip using the first time as an end time in the audio file, and collecting second voice data of a user in the process of playing the first recorded clip that has been recorded to obtain a third recorded clip;
   upon arrival of the first time, collecting first voice data of the user to obtain a second recorded clip and using the second recorded clip and the third recorded clip as recorded clips recorded this time; and
   processing the first recorded clip and the second recorded clip to obtain a re-recorded audio file, wherein the processing the first recorded clip and the second recorded clip to obtain a re-recorded audio file further comprises:
   acquiring a first sound spectrum corresponding to the first recorded clip, and acquiring a second sound spectrum corresponding to the second recorded clip;
   determining, from the first sound spectrum, a flat start point and a second time corresponding to the flat start point in the audio file;
   determining, from the second sound spectrum, a rising start point and a third time corresponding to the rising start point in the audio file;
   using the second time as a start time to select a fourth recorded clip from the recorded clips recorded this time;
   using the third time as an end time to select a fifth recorded clip from the recorded clips recorded last time, the recorded clips recorded last time consisting of the recorded clip to be re-recorded and the first recorded clip; and
   processing the fourth recorded clip and the fifth recorded clip to obtain the re-recorded audio file;
   wherein the second time is earlier than the first time, and the first time is earlier than the third time.

2. The method according to claim 1, wherein the processing the fourth recorded clip and the fifth recorded clip to obtain the re-recorded audio file comprises:
   comparing a sound spectrum corresponding to the fourth recorded clip with a sound spectrum corresponding to the fifth recorded clip;
   acquiring a first target sound spectrum from the sound spectrum corresponding to the fourth recorded clip, and acquiring a second target sound spectrum from the sound spectrum corresponding to the fifth recorded clip, the first target sound spectrum and the second target sound spectrum having the same start time and end time; and
   fitting the first target sound spectrum and the second target sound spectrum so that the fourth recorded clip and the fifth recorded clip are spliced together to obtain the re-recorded audio file.

3. The method according to claim 1, further comprising:
   playing a corresponding accompaniment file in the process of playing recorded clips that have been recorded and recording the recorded clips.

4. A terminal having one or more processors, memory coupled to the one or more processors, and a plurality of program instructions stored in the memory that, when executed by the one or more processors, cause the electronic apparatus to perform the following operations:
   determining a first time, the first time being a start time of a recorded clip to be re-recorded in an audio file;
   playing a first recorded clip in the audio file that has been recorded, the first recorded clip using the first time as an end time in the audio file, and collecting second voice data of a user in the process of playing the first recorded clip that has been recorded to obtain a third recorded clip;
   upon arrival of the first time, collecting first voice data of the user to obtain a second recorded clip and using the second recorded clip and the third recorded clip as recorded clips recorded this time; and
   processing the first recorded clip and the second recorded clip to obtain a re-recorded audio file, wherein the processing the first recorded clip and the second recorded clip to obtain a re-recorded audio file further comprises:
   acquiring a first sound spectrum corresponding to the first recorded clip, and acquiring a second sound spectrum corresponding to the second recorded clip;
   determining, from the first sound spectrum, a flat start point and a second time corresponding to the flat start point in the audio file;
   determining, from the second sound spectrum, a rising start point and a third time corresponding to the rising start point in the audio file;
   using the second time as a start time to select a fourth recorded clip from the recorded clips recorded this time;
   using the third time as an end time to select a fifth recorded clip from the recorded clips recorded last time, the recorded clips recorded last time consisting of the recorded clip to be re-recorded and the first recorded clip; and
   processing the fourth recorded clip and the fifth recorded clip to obtain the re-recorded audio file;
   wherein the second time is earlier than the first time, and the first time is earlier than the third time.

5. The terminal according to claim 4, wherein the operation of processing the fourth recorded clip and the fifth recorded clip to obtain the re-recorded audio file comprises:
   comparing a sound spectrum corresponding to the fourth recorded clip with a sound spectrum corresponding to the fifth recorded clip;
   acquiring a first target sound spectrum from the sound spectrum corresponding to the fourth recorded clip, and acquiring a second target sound spectrum from the sound spectrum corresponding to the fifth recorded clip, the first target sound spectrum and the second target sound spectrum having the same start time and end time; and
   fitting the first target sound spectrum and the second target sound spectrum so that the fourth recorded clip and the fifth recorded clip are spliced together to obtain the re-recorded audio file.

6. The terminal according to claim 4, wherein the operations further comprise:

playing a corresponding accompaniment file in the process of playing recorded clips that have been recorded and recording the recorded clips.

7. A non-transitory computer readable storage medium storing a plurality of program instructions in connection with an electronic apparatus having one or more processors, wherein the plurality of program instructions, when executed by the one or more processors, cause the electronic apparatus to perform the following operations:

determining a first time, the first time being a start time of a recorded clip to be re-recorded in an audio file;

playing a first recorded clip in the audio file that has been recorded, the first recorded clip using the first time as an end time in the audio file, and collecting second voice data of a user in the process of playing the first recorded clip that has been recorded to obtain a third recorded clip;

upon arrival of the first time, collecting first voice data of the user to obtain a second recorded clip and using the second recorded clip and the third recorded clip as recorded clips recorded this time; and processing the first recorded clip and the second recorded clip to obtain a re-recorded audio file, wherein the processing the first recorded clip and the second recorded clip to obtain a re-recorded audio file further comprises:

acquiring a first sound spectrum corresponding to the first recorded clip, and acquiring a second sound spectrum corresponding to the second recorded clip;

determining, from the first sound spectrum, a flat start point and a second time corresponding to the flat start point in the audio file;

determining, from the second sound spectrum, a rising start point and a third time corresponding to the rising start point in the audio file;

using the second time as a start time to select a fourth recorded clip from the recorded clips recorded this time;

using the third time as an end time to select a fifth recorded clip from the recorded clips recorded last time, the recorded clips recorded last time consisting of the recorded clip to be re-recorded and the first recorded clip; and processing the fourth recorded clip and the fifth recorded clip to obtain the re-recorded audio file;

wherein the second time is earlier than the first time, and the first time is earlier than the third time.

8. The non-transitory computer readable storage medium according to claim 7, wherein the operation of processing the fourth recorded clip and the fifth recorded clip to obtain the re-recorded audio file comprises:

comparing a sound spectrum corresponding to the fourth recorded clip with a sound spectrum corresponding to the fifth recorded clip;

acquiring a first target sound spectrum from the sound spectrum corresponding to the fourth recorded clip, and acquiring a second target sound spectrum from the sound spectrum corresponding to the fifth recorded clip, the first target sound spectrum and the second target sound spectrum having the same start time and end time; and fitting the first target sound spectrum and the second target sound spectrum so that the fourth recorded clip and the fifth recorded clip are spliced together to obtain the re-recorded audio file.

9. The non-transitory computer readable storage medium according to claim 7, wherein the operations further comprise:

playing a corresponding accompaniment file in the process of playing recorded clips that have been recorded and recording the recorded clips.

\* \* \* \* \*